United States Patent [19]
Patel

[11] 3,905,221
[45] Sept. 16, 1975

[54] RADIOCHEMICAL METHOD FOR DETERMINING TREADWEAR

[75] Inventor: Arvind C. Patel, Columbus, Ohio

[73] Assignee: Ashland Oil, Inc., Ashland, Ky.

[22] Filed: May 21, 1973

[21] Appl. No.: 362,499

[52] U.S. Cl. .................................................. 73/8
[51] Int. Cl. ........................................ G01n 19/06
[58] Field of Search ........... 250/303, 304; 73/146, 8

[56] References Cited
OTHER PUBLICATIONS

"Rapid Treadwear Ratings With Radioactive Isotopes," Gehman et al., Rubber Chem. and Tech., pp. 969–983, Vol. 40, (1967).

"Measurement of Tyre Wear Using Radioiodine," P. S. Outbridge, Proc. Fourth Rubber Tech. Conf., pp. 234–244, London, 1962.

"Rapid Determination of Tire Wear Using I-125," Asano et al., Annual Report of the Radiation Center of Osaka Prefecture, pp. 130–133, Vol. II, (1970).

Primary Examiner—Donald O. Woodiel
Attorney, Agent, or Firm—Van D. Harrison, Jr.

[57] ABSTRACT

A method for determining amount of treadwear of a tire is disclosed. The tire tread surface is impregnated with a radioactive material (iodine dissolved in toluene) and initial radioactivity measured at the tread surface. Subsequent measurements of radioactivity after wearing away tread indicate the amount of tread loss, when such measurements are compared with a calibration curve of radioactivity prepared for rubber of same composition and radioactive material of same concentration. Calibration curves are made by mechanically measuring loss of tread thickness of radioactive-impregnated rubber samples and measuring corresponding radioactivity remaining.

4 Claims, 2 Drawing Figures

RADIOCHEMICAL METHOD FOR DETERMINING TREADWEAR

NATURE OF THE INVENTION

This invention relates to measuring the wear of rubber articles subjected to continued abrasion and erosion. More specifically it is concerned with a method of determining the rate of wear suffered by tires under actual conditions of use.

PRIOR ART

Although the rate at which tires wear varies widely under different prevailing conditions, it is, nevertheless, important to obtain a reasonably accurate determination of the relative rates of wear of different tires under normal range of environmental conditions. To the manufacturers of tires such wear tests are particularly important in determining the optimum types and proportions of natural and synthetic rubbers, carbon black, extender oils, and other ingredients used in formulating rubber compositions for tire manufacture. Wear tests also provide automobile manufacturers information of value in designing the front wheel geometry of automobile vehicles.

In the past, various approaches to measuring the treadwear have been used. One method has been based on determining the progressive loss of treadwear by a series of successive weighings. This method at best is cumbersome and troublesome.

In another approach, bits of wire made from beta-emitting radioactive metals fused with nonradioactive carrier metals have been implanted in the tire tread at various depths. As the tread surface is abraded, the amount of beta radiation adsorbed in the region between the tread surface and the inserted wire bits diminishes. Successive readings made at the tread surface correlate with the rate of treadwear. This technique has the disadvantage of requiring precise and exact positioning of the wire bits in the tread body. The bits are of necessity held in place only by mechanical bonding rather than chemical bonding and thus are more subject to dislocation.

The possibilities of using radioisotopes for rapid treadwear measurement has been recognized and tested for some years. In one method (Proceedings, Fourth Rubber Technology Conference, London (1962), p. 234) predetermined volumes of a solution of radioactive iodine in toluene are applied at a number of points on the periphery of the tire to the tread surfaces through an open-ended metal tube pressed against the tread surface. The toluene-iodine solution penetrates a short distance into the tread. This same technique is also used to impregnate points on abrasion or calibration wheels made of the same rubber stock. The calibration wheels are then, in successive stages, abraded by grinding, weighed to determine weight loss, and measured for radioactivity (count rate) at the points of added iodine. A plot of mils of rubber removed versus percentage remaining of original count rate yields a calibration curve which can then be used to determine the treadwear rate of the correspondingly treated tires after they have been subjected to road use at successive intervals. Although this is an effective means of determining treadwear, it has the disadvantage in that depth of penetration of the radioactive iodine is shallow (about 250 microns or 10–15 mils) thus permitting only limited testing of treadwear. Practical applications of this technique, therefore, have not been attempted.

In a refinement of the radioactive chemical test method, strips of filter paper laminated to a plastic sheet and an aluminum foil backing have been immersed in solutions of radioactive iodine in toluene and partially dried (Rubber Chemistry and Technology, 40, 969 (1967); or partially saturated with the solution (Annual Report of the Radiation Center of Osaka Prefecture, 11, 130 (1970); Chem. Abstracts, 76, 60691e (1972) ). These laminated strips are then applied to predetermined locations on the periphery of the tire being tested, with the exposed surface of the filter paper against the tire surface, and held in place for a predetermined time period (2 and one-half minutes). For calibration purposes, specimens of the same rubber composition suitably mounted in rigid holders are impregnated in a similar manner as were the tire tread surfaces. The surfaces of the calibration specimens are then abraded at 2-mil intervals and counted with a scintillation probe after each cut. A plot then of percent of original radioactivity retained versus total mils of thickness of specimen removed functions as a calibration curve for the corresponding tires similarly impregnated. Unfortunately this refinement, using strips of filter paper partially saturated with the carrier solution, still results in only a maximum of 10-12 mils penetration of the radioactive iodine into the tread body. The method of abrading the calibration samples has also proved inaccurate in that measurement has been based on measuring the displacement of the grinding wheel and not actual measurements of the tread surfaces.

There still exists a need for a relatively rapid and accurate method for measuring successive intervals of tire treadwear resulting from naturally occurring conditions of abrasion and erosion.

SUMMARY OF THE INVENTION

Briefly stated this invention comprises a method for measuring the amount of reduction in radial tread thickness of a rubber tire comprising:
  a. applying at least one section of flexible sorbent material saturated with a solution containing a radioactive element dispersed therein to, and in intimate contact with, the tread surface of said tire, said solution being capable of wetting said tread surface;
  b. maintaining said intimate contact for a predetermined period of time;
  c. removing said sorbent material from contact with said tread surface;
  d. abrading said tread thickness in successive steps; and
  e. measuring, at the end of each successive step of (d) the radioactivity at each location on said tread surface where said sorbent material of (a) has been applied;

thereby obtaining an indication of the tread thickness remaining on said tire at each of said locations where said saturated sorbent material has been applied, when the radioactivity measured is compared with a predetermined plot of treadwear versus radioactivity.

BRIEF DESCRIPTION OF THE DRAWINGS

In the drawings, FIG. 1, Curve A, shows a plot of percent of residual radioactivity versus amount of tread loss when the tread surface is impregnated with a solution of radioactive iodine in toluene by the prior art method using thin strips of partially saturated filter paper. Curve B shows a similar plot when the tread surface is impregnated by the method of this invention.

DETAILED DESCRIPTION OF INVENTION

Figure 1:
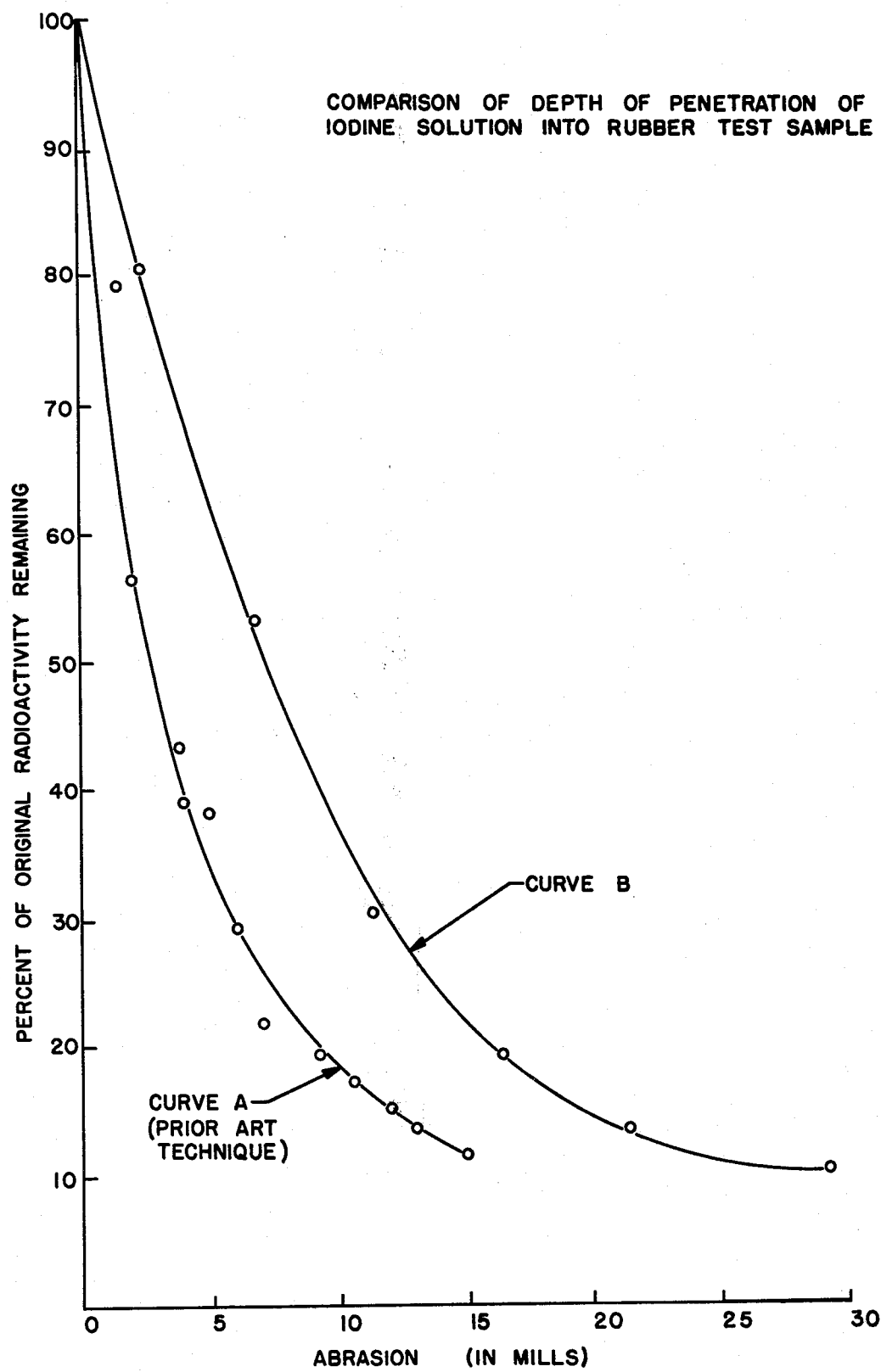

In practicing my invention it is first necessary to make a calibration curve corresponding both to the type of rubber in the tire to be tested and to the particular solution of radioactive element used.

Any rubber composition is amenable to this testing procedure as long as the test solution used wets and can be absorbed into the rubber composition. This testing method is particularly well suited for testing the four major treadstocks used; styrene-butadiene (SBR); styrene-butadiene and cis-polybutadiene blends (SBR/BR), natural rubber (NR) and natural rubber and cis-polybutadiene blends (NR/BR).

As to the liquid dispersion of radioactive element, several types are available, but I prefer a solution of radioactive iodine (I-125) in toluene having a specific activity of between about 0.5 and about 7 micro Curies per milliliter and a concentration of ordinary iodine of between about 0.001 and about 0.036 grams per milliliter. An optimum solution has been a toluene solution of 0.0155 grams of iodine per milliliter and a total activity of 5 micro Curies per milliliter. Actually, of course, the lower limit of the radioactivity of the solution is determined by the sensitivity of the radioactivity counting instruments.

Prior to measuring the actual reduction in treadwear of a test tire according to my invention it is necessary to make a series of calibration tests to arrive at the curvilinear relationship between the amount of treadwear and the decrease in radioactivity or fraction of original remaining radioactivity at a test point on the tire.

This calibration is most easily done by cutting segments from the center of a tire of the same composition as the one to be road tested. Specimens approximately 2½ inches square can be cut and firmly attached to a steel plate of slightly larger dimensions. A preferred method of attaching is through the use of an adhesive such as one tradenamed "Devcon Plastic Steel," Type "A". The specimen and steel plate can then be held rigidly in place by a magnetic chuck while the surface of the sample is first ground to a uniform flatness by a precision grinder mounted above the specimen surface and adapted to be moved laterally across the surface of the calibration sample. Ideally and for greatest accuracy the direction of grinding is first laterally in one direction across the specimen surface and then again laterally in an opposite (180°) direction.

After a calibration sample has been mounted and brought to a uniform flatness it is impregnated or tagged with the radioactive solution of iodine in toluene. The method of tagging is one of the more important inventive features of my invention. The prior art practice has been to use narrow-thickness, foil- and plastic-backed strips of sorbent filter paper only partially saturated with the toluene solution. I have discovered that a strip of sorbent paper having a uniform and minimum thickness of 25 mils and completely saturated with iodine-in-toluene solution provides much greater penetration of the radioactive iodine into the rubber specimen.

Accordingly, in tagging the calibration samples, rectangular strips of blotting paper, (for example Kodak brand, extra heavy, 120 lb.) 2 by 1½ inches are immersed in the tagging solution until completely saturated (about 50 to 55 seconds). The strip of paper is then removed from the solution, quickly drained to remove excess solution and immediately transferred to a preselected point on the calibration sample. The paper strip is then covered with aluminum foil and taped securely. The time for this operation consumes about 55 to 60 seconds and essentially is kept to a minimum. The tagged calibration samples are kept at room temperature for approximately five hours and at the end of this time the blotting paper is removed and discarded. The tagged specimens are then allowed to stand for approximately 3 to 4 hours and are then impregnated with a toluene solution of silver perchlorate (5 grams per 100 milliliters) in a manner identical to the preceding steps. This addition of silver perchlorate serves to immobilize any excess iodine in the rubber which has not yet chemically combined with the rubber.

The calibration curve is then run in successive steps by alternately grinding away part of the tread thickness (1–3 mils per step) measuring the loss of tread thickness and determining the radioactivity of the treated section of the sample. The amount of tread loss can be determined in a variety of ways such as by successive weighings. A preferred technique is by the use of dial gauges which are designed to determine the tread thickness by difference, that is, by measuring the thickness of the sample at the bottom of the tread ridge where the tread joins the tire body and at the top or exterior radial surface of the tread. In many cases it is desirable to make several measurements at different locations on the calibration sample and to average these determinations. The technique of measuring radioactivity is well known to those skilled in the art. It is, of course, most important to obtain a preliminary radiation count before any of the calibration sample is removed by grinding. A typical calibration curve is presented in FIG. 1 and is further described in Example I which follows subsequently. From FIG. 1 it will be observed that if abrasion loss (in mils) is plotted versus percent or fraction of original radiation remaining, an exponential curve results which flattens after a certain depth of penetration of radioactive iodine is reached. The point at which the curve flattens is dependent upon the elastomer compound, the concentration of the iodine tagging solution, and the tagging technique used. The calibration curve has little use after it flattens, but by observing the process of this invention, the useful range of the calibration curve has been extended from a former range of 10 to 12 mils penetration to a present range of about 25 to 30 mils penetration (1 mil equals 0.001 inch).

The technique for tagging the tire or tires to be road tested is sufficiently similar to that for tagging the calibration samples that it need not be described again in detail. In tagging the tires to be road tested, however, the strips of sorbent material, such as blotting paper, are preferably about 4 by 1½ inches in dimension. It is advisable for statistical accuracy to tag at least six locations equally spaced around the circumference of the tire. The tagging strips are laid transversely across the tire tread so that the longest dimension of each strip parallels the axis of the tire and parallel portions of the tread pattern are all contacted by the completely saturated strip.

In the road testing of tires after they have been tagged as described previously, the tires are mounted on the test vehicle, balanced and otherwise adjusted. After the vehicle has been driven a predetermined distance, the radioactivity of each of the test spots on each tire is measured. The measured redioactivity expressed in terms of the fraction of original radioactivity remaining is then compared directly with the calibration curve previously made. An obvious advantage of this technique is that the tires need not be removed from the test vehicle since the radioactivity measurements can be made on each tire without removing it. A series of road runs can be conducted using the same set of tires mounted on the test vehicle until the treads are sufficiently abraded or worn so that insufficient radioactive iodine remains for accurate readings. At that point the tires can be retagged and additional testing conducted.

EXAMPLE 1

To illustrate the difference between the prior art method of tagging tires and calibration samples and the method of this invention, two calibration samples were prepared from a rubber tire having a styrene-butadiene composition by cutting 2½ by 2½ inch squares and attaching each of these with adhesive to a steel plate. One calibration sample, designated A, was prepared using the prior art technique of applying only a thin, partially saturated, strip of filter paper to the calibration sample in the tagging step. A second calibration sample was prepared using the same tagging solution and blotting paper completely saturated with tagging solution. In each calibration sample the paper strips were approximately 2 × 1½ inches. The tagging solution was a solution of 0.0155 grams per milliliter of iodine in toluene and had a total activity of 5 micro Curies per milliliter. The method of tagging followed in preparing the "A" sample was that used in the prior art requiring thin strips of filter paper only, partially saturated with tagging solution. The "B" calibration sample was prepared using the method of this invention. A strip of blotting paper soaked in the tagging solution was removed from the solution, excess liquid quickly drained off and immediately applied to a pre-selected spot on the calibration sample. The paper strip was then covered with aluminum foil, taped securely and allowed to sit for 5 hours. The paper and foil were then removed from the B sample and it was allowed to stand for between 2 and 3 hours. Subsequently a similarly proportioned strip of blotting paper saturated with a toluene solution of silver perchlorate (.05 grams per milliliter) was applied to the "B" sample at the same location where the radioactive toluene solution had previously been applied, was covered with foil, taped in place, and allowed to sit for approximately 16 hours. The application of the silver chlorate served to immobilize any free iodine not chemically combined with the rubber, by converting the free iodine to silver iodide. At the end of the 16-hour period the paper strip and foil were removed and the sample allowed to dry for about 2 hours.

In radial cross-section each of the tread samples presented a series of alternating flat-topped ridges and flat-bottomed grooves. The initial tread thickness before any abrasion was determined by using a dial gage with plunger and by averaging the differences of several dial gage readings taken with the plunger resting alternately on the flat-bottomed grooves and on the flat-topped ridges. The initial radioactivity was also determined using a scintillation detector connected to a Multichannel Analyzer, Nuclear Data Model 2201 and a counting time of 100 seconds. The two samples were then progressively abraded with a precision grinder in lateral directions 180° to each other in stages of 1 to 3 mils. The depth of grinding was determined each time by making several measurements with the dial gage and plunger and averaging. The remaining radioactivity was also measured, as described previously, at each stage of grinding. A plot of percent of original radioactivity remaining versus amount of grinding (loss of tread) in mils gave the graph shown in FIG. 1. Data points are tabulated in Table 1. It will be noted that the curve obtained with Sample A flattens to a point of little utility after about 8 to 10 mils of grinding but that Sample B prepared according to the process of this invention remains usable for another 15 to 20 mils of grinding or tread loss.

TABLE 1

Comparison of Penetration of Radioactive
Iodine into Styrene-Butadiene Rubber
Sample A
(Prior Art Method)

| Abrasion (Loss of Tread) (in Mils) | % Radioactivity Remaining |
| --- | --- |
| 0 | 100 |
| 1.4 | 79.4 |
| 1.8 | 56.5 |
| 3.4 | 43.9 |
| 4.8 | 38.5 |
| 5.7 | 29.2 |
| 6.9 | 22 |
| 9 | 19.6 |
| 10.3 | 17.2 |
| 11.7 | 15.6 |
| 12.6 | 13.9 |
| 14.6 | 12 |
| Sample B | |
| 0 | 100 |
| 2.4 | 80.9 |
| 6.7 | 53.5 |
| 11.4 | 30.9 |
| 16.2 | 19.5 |
| 21.2 | 13.9 |
| 29 | 10.5 |

EXAMPLE 2

Figure 2:
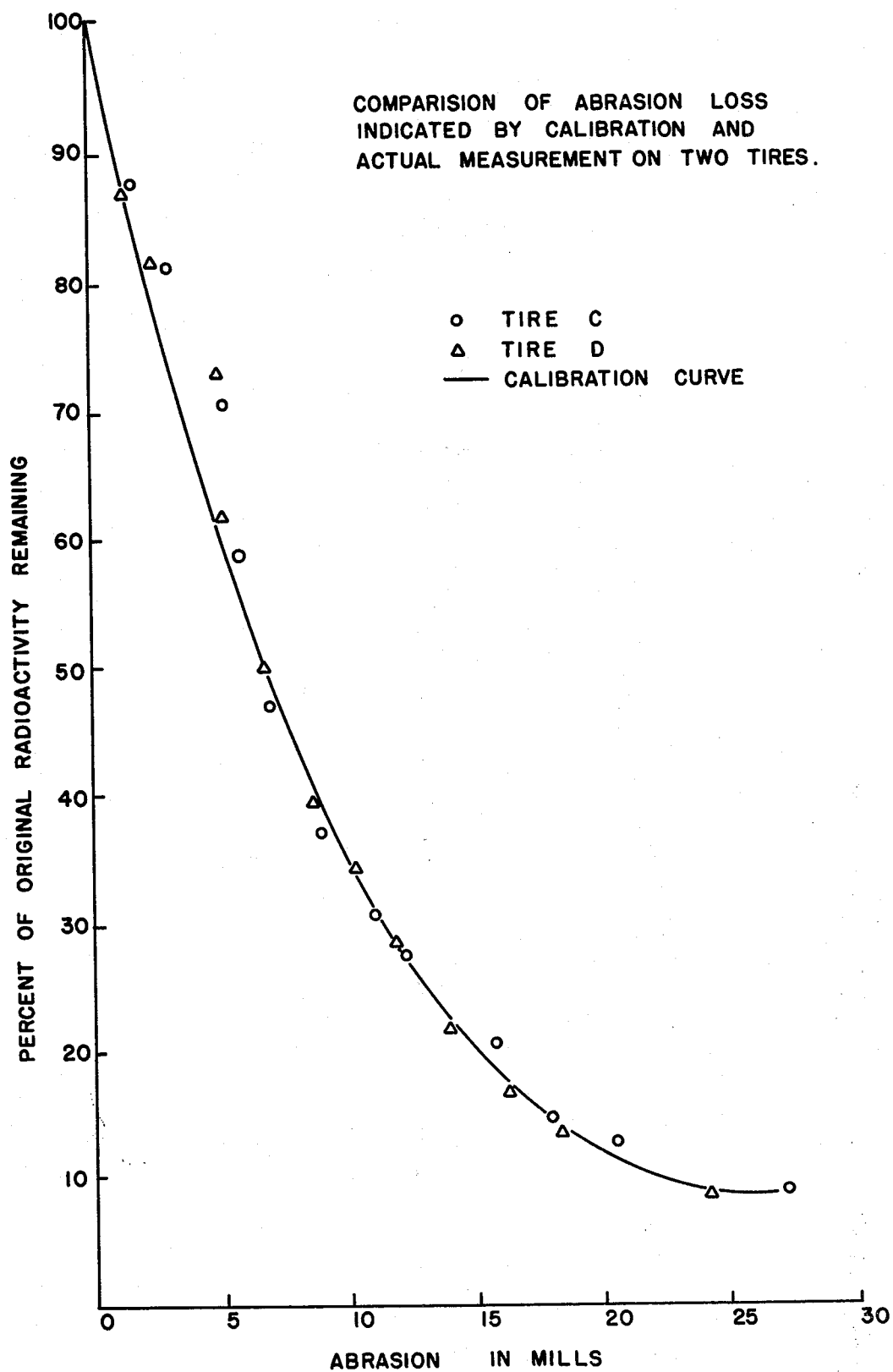
FIG. 2, shows the remarkable agreement between a calibration curve obtained by the method of this invention for a natural rubber composition and the actual measured wear and measured remaining radioactivity of two tire specimens, C and D of the same rubber composition.

Six calibration samples of a natural rubber composition were tagged and abraded in a manner identical to that for Sample B in Example 1. A plot of the average data points for degree of abrasion versus residual radiation resulted in the calibration curve shown in FIG. 2. Data points plotted are shown in Table 2 but are not individually shown on the calibration curve.

TABLE 2

Calibration Curve - Natural Rubber
and .0155 gms/ml Iodine in Toluene

| | Abrasion (Loss of Tread) (in Mils) | % Radioactivity Remaining |
| --- | --- | --- |
| Sample No. 1 | 0 | 100 |
| | 1.8 | 85 |
| | 6.9 | 51.1 |
| | 11.2 | 27 |
| | 16.7 | 13.2 |
| | 24.1 | 9.2 |
| Sample No. 2 | 0 | 100 |
| | 6.5 | 60.1 |

TABLE 2-Continued

Calibration Curve - Natural Rubber
and .0155 gms/ml Iodine in Toluene

|  | Abrasion (Loss of Tread) (in Mils) | % Radioactivity Remaining |
|---|---|---|
|  | 11 | 33.4 |
|  | 15.5 | 18.5 |
|  | 20.4 | 10.6 |
|  | 28.7 | 9.5 |
| Sample No. 3 | 0 | 100 |
|  | 3 | 85 |
|  | 7.1 | 55.6 |
|  | 11.6 | 31.1 |
|  | 16.6 | 19 |
|  | 25 | 11.5 |
| Sample No. 4 | 0 | 100 |
|  | 1.4 | 90.6 |
|  | 5.2 | 59.6 |
|  | 10.4 | 30.9 |
|  | 14.8 | 16.8 |
|  | 19.4 | 11.3 |
| Sample No. 5 | 0 | 100 |
|  | 2.3 | 81.7 |
|  | 6.6 | 52.5 |
|  | 9.5 | 38.1 |
|  | 14.2 | 20.4 |
|  | 19.7 | 13.2 |
|  | 23 | 10.7 |
| Sample No. 6 | 0 | 100 |
|  | 2.1 | 84.2 |
|  | 4.9 | 69.4 |
|  | 6.2 | 55.2 |
|  | 11.4 | 28.8 |
|  | 16.5 | 15.6 |
|  | 21.6 | 12.3 |

Two tires designated C and D having identical tread compositions to that of the calibration samples were then tagged at six locations in a manner identical to the tagging of Sample B in Example 1. The two tires were then mounted on a vehicle and abraded by driving predetermined intervals of distance. The treadwear at the end of each interval of distance was determined mechanically using specially designed laboratory measuring equipment. The amount of remaining radioactivity on each of six locations on each tire was also measured at the end of each interval and the six readings averaged. The value of mechanically measured abrasion and the corresponding remaining radioactivity are plotted on FIG. 2. Data points plotted are shown in Table 3.

TABLE 3

Tread Loss (Mechanically Measured) and Corresponding Radioactivity Remaining

| | Tire C (Left Rear) | | | | Tire D (Right Rear) | | | |
|---|---|---|---|---|---|---|---|---|
| Miles | Treadthickness In Mils. | Tread Loss In Mils. | Total Loss In Mils. | % Radioactivity Remaining | Treadthickness In Mils. | Tread Loss In Mils. | Total Loss In Mils. | % Radioactivity Remaining |
| 0 | 323.1 | 0 | 0 | 100 | 304.8 | 0 | 0 | 100 |
| 121 | 321.6 | 1.5 | 1.5 | 86.8 | 302.9 | 1.9 | 1.9 | 87.4 |
| 242 | 320.6 | 1 | 2.5 | 81.3 | 301.6 | 1.3 | 3.2 | 81 |
| 375 | 318.1 | 2.5 | 5 | 72.6 | 299.4 | 2.2 | 5.4 | 70.1 |
| 500 | 317.8 | 0.3 | 5.3 | 61.5 | 298.9 | 0.5 | 5.9 | 58.4 |
| 675 | 316.3 | 1.5 | 6.8 | 49.7 | 297.8 | 1.1 | 7 | 46.5 |
| 825 | 314.5 | 1.8 | 8.6 | 39.2 | 295.8 | 2 | 9 | 36.3 |
| 1000 | 312.7 | 1.8 | 10.4 | 33 | 293.8 | 2 | 11 | 30.1 |
| 1125 | 311.3 | 1.4 | 11.8 | 28.7 | 292.6 | 1.2 | 12.2 | 27.3 |
| 1325 | 309.1 | 2.2 | 14 | 21.5 | 289.1 | 3.5 | 15.7 | 20.3 |
| 1525 | 306.8 | 2.3 | 16.3 | 16.3 | 286.8 | 2.3 | 18 | 14.8 |
| 1725 | 304.8 | 2 | 18.3 | 13.4 | 284.5 | 2.5 | 20.5 | 12.6 |
| 2225 | 298.9 | 5.9 | 24.2 | 8.4 | 277.8 | 6.7 | 27.2 | 8.7 |

It will be observed that the correlation between the abrasion measured by mechanical means and the abrasion indicated by the calibration curve is excellent.

Although the foregoing disclosure is directed to measuring the abrasion of tire tread, it is not my intention to limit the scope of the invention to such. The method disclosed and claimed has equal application to measuring the degree of wear or abrasion of other types of rubber articles subjected to abrasive wear. It should be noted also that this method enables one to compare the rates of wear of individual tread components of a tread design. Treadwear studies of the type described herein can be combined with autoradiograph studies to great advantage.

What is claimed:

1. A method for determining the reduction in radial thickness of at least a portion of a rubber tire comprising:
    a. providing at least one sample of rubber of the same composition as said rubber tire, said sample having an exposed surface of uniform flatness;
    b. applying to the exposed surface of said rubber sample a section of flexible sorbent material having a minimum thickness of 25 mils and saturated with a liquid solution containing a radioactive element dispersed therein, said solution being capable of wetting and being absorbed into said rubber sample;
    c. maintaining said sorbent material in intimate contact with said exposed surface for a predetermined time.
    d. removing said sorbent material from contact with said tread surface;
    e. measuring and recording the radioactivity of said exposed surface at the point of contact with said sorbent material;
    f. in successive steps abrading the exposed surface to a uniform flatness;
    g. measuring by mechanical means the thickness of rubber lost by each abrasion in (f);
    h. measuring and recording the fraction of original radioactivity of said surface remaining after each successive step of abrading;
    i. providing a graph of the ratio of measured radioactivity fractions of (h) versus reduction of sample thickness resulting from said successive steps of abrading of (f);
    j. applying at least one section of a flexible sorbent material saturated with a solution containing a radioactive element dissolved therein, said solution being capable of wetting said tire, to and in intimate contact with the tread surface of said tire;
    k. maintaining said intimate contact for a predetermined period of time;
    l. removing said sorbent material from contact with said tread surface;
    m. abrading said tread thickness in successive steps;

n. measuring the fraction of original radioactivity remaining at each location on said tread surface where said sorbent material of (j) has been applied; and o. determining the remaining tread thickness at each of said measured locations by comparing the fraction of original radioactivity remaining at each location with the graph of measured radioactivity fractions versus reduction of sample thickness.

2. The method of claim 1 wherein said solution of (a) and of (i) containing a radioactive element in solution is a solution of radioactive iodine in toluene.

3. The method of claim 2 wherein said radioactive iodine is I-125.

4. The method of claim 1 wherein said flexible sorbent material is blotting paper.

* * * * *